United States Patent [19]

Fry et al.

[11] 3,991,352

[45] Nov. 9, 1976

[54] APPARATUS AND METHOD FOR REDUCING EFFECTIVE INDUCTANCE IN A DYNAMIC BRAKING CIRCUIT

[75] Inventors: Warren C. Fry, Bulleskin; Frederick O. Johnson, Monroeville; John Rosa, Penn Hills Township, all of Pa.

[73] Assignee: Westinghouse Electric Corporation, Pittsburgh, Pa.

[22] Filed: June 19, 1975

[21] Appl. No.: 588,571

[52] U.S. Cl. .............................. 318/211; 318/278; 318/380
[51] Int. Cl.² .......................................... H02P 3/20
[58] Field of Search .......................... 318/209–212, 318/228, 229, 380

[56] References Cited
UNITED STATES PATENTS

| | | | |
|---|---|---|---|
| 2,740,932 | 4/1956 | King | 318/212 X |
| 3,708,734 | 1/1973 | Rowe | 318/212 |
| 3,758,837 | 9/1973 | Stauber et al. | 318/212 |
| 3,815,002 | 6/1974 | Clemente et al. | 318/209 |
| 3,906,314 | 9/1975 | Wiart | 318/212 X |

*Primary Examiner*—Gene Z. Rubinson
*Attorney, Agent, or Firm*—R. G. Brodahl

[57] ABSTRACT

A method and apparatus are disclosed for reducing effective inductance and providing balanced line-to-line voltages in induction machine dynamic braking circuits which utilize braking resistors to substantially increase the full torque braking range of the machine. The current phase lag caused by the inductive property of conventional braking resistors, is substantially reduced by rectifying the current provided to the braking resistor through a three-phase rectifier bridge. This reduction of the current phase lag permits a reduction in the capacitance required to compensate for the effective inductance in the dynamic braking circuit. Furthermore, because the braking currents flow through a common braking resistor, the line-to-line stator motor voltages are inherently balanced. If the prior art braking impedance control is also employed, the rectifier bridge need carry current only if dynamic braking is required when motor voltage is greater than the maximum voltage of the inverter supplying the machine. Where the braking resistor may be varied in a step-wise manner, the amount of dynamic braking capacitance needed for inductive compensation is reduced below the substantial reduction realized for a non-variable resistor. Depending upon the required degree of performance and the allowable complexity of the braking circuit, the prior art braking impedance control may be eliminated and the effective impedance of the common braking resistor may be varied in either a continuous or a step-wise manner.

12 Claims, 6 Drawing Figures

… … …

APPARATUS AND METHOD FOR REDUCING EFFECTIVE INDUCTANCE IN A DYNAMIC BRAKING CIRCUIT

BACKGROUND OF THE INVENTION

1. Field of the Invention

The disclosed invention relates to a method and apparatus for providing full torque dynamic braking of induction motors over the full range of operating speed.

2. Description of the Prior Art

Although direct current series motors have usually been used for vehicle traction drives because of their desirable speed-torque characteristics and adaptability to dynamic braking, the alternating current, squirrel-cage induction motor is inherently of very rugged construction and would be highly suitable for the severe conditions of traction service in which a propulsion motor is subjected to severe vibration and mechanical shock conditions as well as being exposed to dirt and other airborne contamination. The development of high power, variable frequency static inverters, has made it possible to consider the use of induction motors for traction drives in order to take advantage of their rugged construction, freedom from commutation problems and relative ease of control. One problem, however, in the use of induction motors in traction drives has been that of obtaining adequate braking torque when operating in the braking mode. Since the torque developed in the motor is a function of the voltage applied to the stator windings, substantially constant torque with increasing speed may be obtained in the motoring operation by increasing the applied voltage for the inverter approximately proportionally with inverter output frequency until the maximum voltage rating of the inverter is reached. After the maximum voltage rating of the inverter is reached, the torque decreases as the frequency and speed increase. Although this is generally acceptable for motor operation because less accelerating capability is required at the higher speeds, for braking operation it is desirable to have a braking torque at least as high as the maximum motor torque over the entire range of operating speeds. That is, the machine should be operated at constant torque even at speeds where the induction machine voltage exceeds the inverter voltage so as to maintain essentially constant braking torque and provide a constant rate of deceleration over a wide speed range.

Since the torque developed by the machine is a function of the voltage across the stator windings, maximum braking torque over a wide speed range could be supplied merely by increasing inverter voltage. However, this would require an inverter whose maximum voltage rating is several times the maximum applied voltage needed during motor operation so that the size and cost of the inverter would make it impractical for traction use. Therefore, induction machine braking circuits of the prior art have provided for increasing the voltage across the motor windings during the braking operation by inserting a braking resistance in series with the induction machine windings. Since the torque developed in the machine is a function of a voltage across the machine windings, this results in increased torque without requiring any increased voltage supplied by the inverter to the machine windings above that required for motor operation. The desired braking torque can thus be obtained without any increase in size or cost of the inverter above that required for motoring operation. Braking torque is controlled to obtain a desired braking characteristic or rate of deceleration by controlling the effective value of the braking resistance during the braking operation through phase control of firing pulses applied to thyristors which shunt the braking resistance. Such a method for controlling induction motor braking torque by controlling the effective resistance of braking resistors in series relation with the induction motor windings is disclosed in U.S. Pat. No. 3,815,002 of S. Clemente and B. R. Pelly.

The prior art methods for increasing the dynamic braking capability of an induction machine variable frequency drive combination have performance characteristics which are limited by the effective inductance of the braking resistors and the inductance of the motor. Since improved performance of these prior art methods required non-reative braking impedance elements, capacitors were used to compensate for the inductance of the braking resistors and to partially compensate for the inductance of the motor windings and the current phase lag caused by the controlled conduction of the braking thyristors. This capacitive compensation significantly improves the performance of the braking scheme, particularly at higher operating frequencies. It was recognized that it would be advantageous to significantly reduce the capacitance required in induction motor dynamic braking circuits of the prior art. Additionally, because the wye connected resistors of induction motor dynamic braking circuits of the prior art required that each leg of the wye connected resistors be individually balanced to achieved line-to-line voltages, it was also recognized that it would be advantageous to provide for motor voltages which are inherently balanced.

SUMMARY OF THE INVENTION

In induction motor dynamic braking circuits using a braking impedance to increase the voltage across the induction machine stator windings to provide full braking torque over the full range of operating speeds, a method and apparatus is provided for substantially reducing the effective inductance of the braking impedance and for providing inherently balanced line-to-line motor voltages by providing a unidirectional braking current to a common braking impedance through a rectifier bridge. Because the effective inductance of the common braking impedance is substantially reduced, the capacitance necessary for inductive compensation for the braking circuit is substantially decreased. There may be switching apparatus for controlling the effective braking impedance so that the rectifier bridge and the common braking impedance carry braking current only during the braking mode. The common braking impedance may be variable, either in a continuous or a step-wise manner, so that the switching apparatus for controlling the effective braking impedance is unnecessary.

PREFERRED EMBODIMENT OF THE INVENTION

Figure 1:
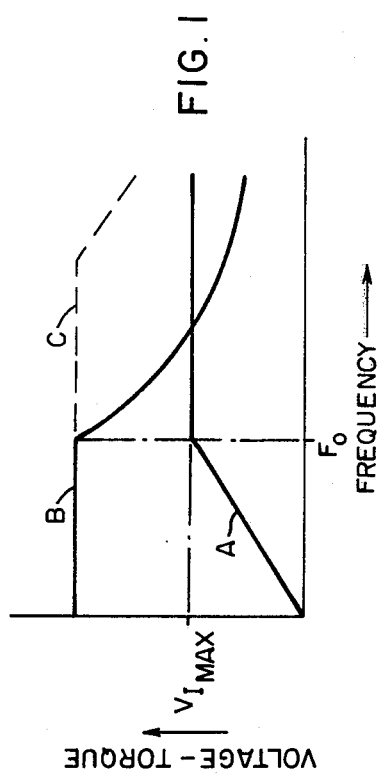
In FIG. 1, Curve A illustrates the maximum voltage generated by a static inverter with respect to the inverter frequency; Curve B illustrates the motor torque of an induction motor with respect to the voltage and frequency of Curve A; and Curve C illustrates a desirable induction motor braking torque in which the maximum braking torque over the full range of operating speeds is as great as the maximum motoring torque.

Curve A of FIG. 1 represents a variable frequency inverter voltage supplied to the stator windings of an induction machine and Curve B of FIG. 1 represents the speed-torque characteristics of the induction machine during motoring operation. Curve A of FIG. 1 shows that the variable frequency inverter produces a variable voltage-variable frequency output with a fixed voltage-to-frequency ratio up to a predetermined output frequency which is designated as $F_o$. For frequencies greater than $F_o$, the inverter output voltage is a maximum value designated as $V_{I\,max}$. It is seen from Curves A and B that, for the motor operation, the applied voltage is increased linearly as the speed increases to maintain constant motor torque until the maximum inverter voltage is reached at frequency $F_o$, after which the voltage remains constant and the torque decreases.

Curve C of FIG. 1 represents a desirable speed-torque characteristic for an induction machine during dynamic braking operation. Curve C shows a braking torque curve in which braking torque is as great as the maximum motor torque over a wide range of motor speed to provide the necessary braking effort to control the rate of deceleration and maintain a substantially constant deceleration rate over a relatively wide speed range. However, in order to obtain the desired braking torque characteristic of curve C, the voltage applied to the machine must be higher at frequencies above $F_o$ than the maximum voltage necessary for motor operation. Although a speed-torque braking curve such as Curve C could be obtained by continuing the linear increase in the applied inverter voltage for frequencies above $F_o$, such an increase in the voltage obtainable from the inverter would require a very large, expensive inverter which would not be economically practical for many applications.

Figure 2:
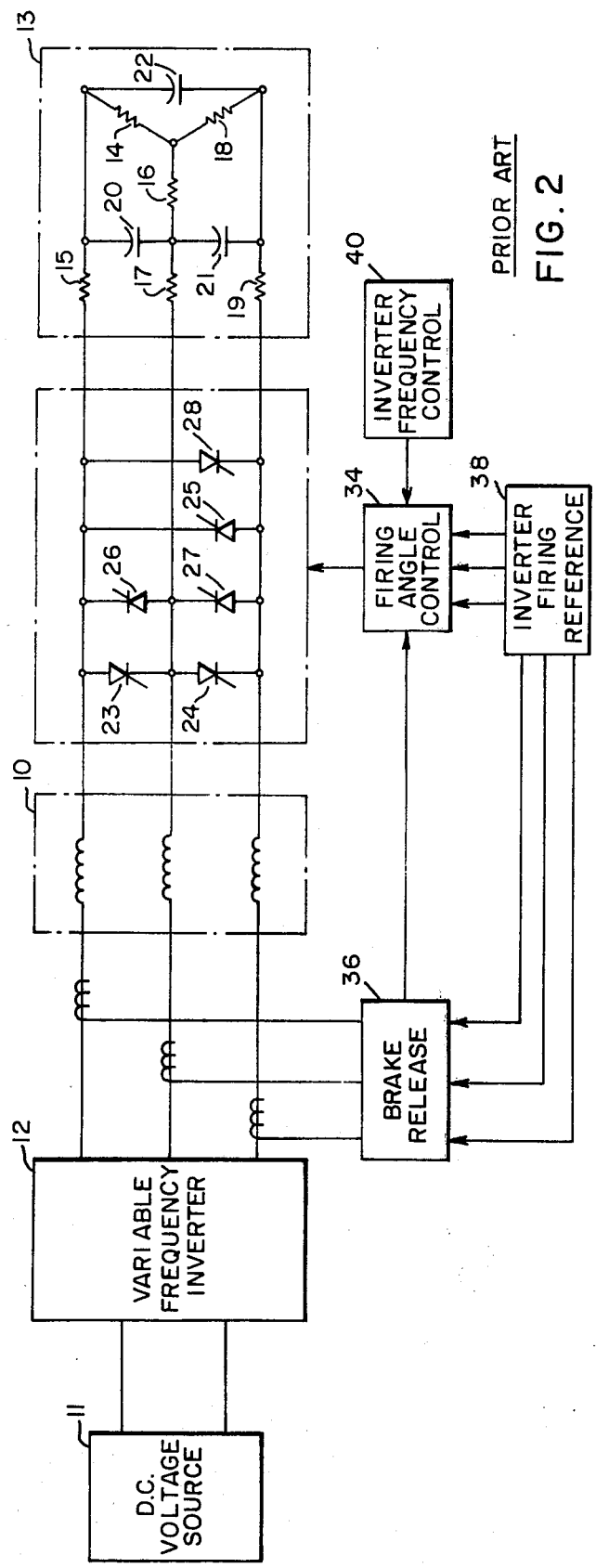
FIG. 2 represents a basic induction motor dynamic braking circuit as known in the prior art and which is capable of producing the braking torque of Curve C of FIG. 1.

FIG. 2 represents an induction motor braking circuit of the prior art which provides maximum braking torque over a wide speed range without requiring a higher inverter voltage than is required for motoring. A variable frequency voltage is supplied to the three-phase, induction motor stator windings 10 from a variable frequency inverter 12 which is supplied form a constant voltage, direct current source 11. A dynamic braking impedance 13, comprised of resistors 14 through 19 and capacitors 20, 21 and 22, is connected in series with the motor windings 10 when thyristors 23 through 28 are non-conductive. Thyristors 23, 24 and 25 are placed in parallel with thyristors 26, 27 and 28 respectively to eliminate even harmonics and provide better control.

When the induction machine is in the motoring mode, the voltage applied to the motor windings 10 from the variable frequency inverter 12 increases linearly with increasing frequency until the maximum rated voltage $V_{I\,max}$ is reached at frequency $F_o$. After reaching this maximum rated voltage, the applied voltage remains constant with increasing frequency, such as generally shown by Curve A of FIG. 1. As the frequency increases, the linearly increasing applied voltage maintains constant motor torque until the maximum rated voltage is reached at frequency $F_o$, after which the constant applied voltage causes the torque to decrease so that the motor operates at approximately constant horsepower, such as generally shown by Curve B of FIG. 1. This decrease in torque is acceptable for motor operation at least in those applications where less acceleration is required at the higher part of the speed range than at the lower part of the speed range. During the entire motoring operation, the firing angle control 34 supplies continuous firing signals to the thyristors 23 through 28 so that they are kept conductive to short out resistors 14 through 19 and and capacitors 20, 21 and 22 of the dynamic braking impedance 13 to maintain the motor winding 10 in a conventional three-phase wye connection.

During the braking operation, it is desirable to provide full braking torque over the entire range of operating speed, such as generally shown by Curve C of FIG. 1. To accomplish this full torque braking when the induction machine is operating at frequencies greater than $F_o$, the voltage supplied to the motor windings 10 must be higher than the rated maximum inverter voltage provided for motor operation. The circuit of FIG. 2 establishes the higher voltage necessary to maintain full torque braking operation by controlling the conduction periods of thyristors 23 through 28 to regulate the voltage across dynamic braking impedance 13 so as to make the ratio of motor voltage to operating frequency substantially constant for frequencies greater than $F_o$. This can be expressed by the relation:

$$\frac{(V_I + V_B)}{F} = \text{constant} \tag{1}$$

where:

$V_I$ represents the voltage of variable frequency inverter 12;

$V_B$ represents the voltage of dynamic braking impedance 13; and $F$ represents the operating frequency.

The result is a significantly wider range over which the maximum braking torque can be produced without requiring the inverter 12 to supply a higher voltage than is required for motoring operation.

Thyristors 23 through 28 may be made conductive during motor operation and controllably non-conductive during braking operation in relation to current signals derived from the inverter output and supplied to a brake release circuit 36 which is also supplied with signals from an inverter firing reference 38. The firing angle control 34 receives signals from brake release circuit 36, the inverter reference 38, and an inverter frequency control 40 to provide the gate signals for firing the thyristors 23 through 28 at the appropriate phase-angle of each inverter voltage half-cycle. firing angle control 34 thereby controls the effective impedance of dynamic braking impedance 13 by making thyristors 23 through 38 controllably non-conductive so that braking impedance 13 is in series with the three-phase motor windings 10.

Figure 3:
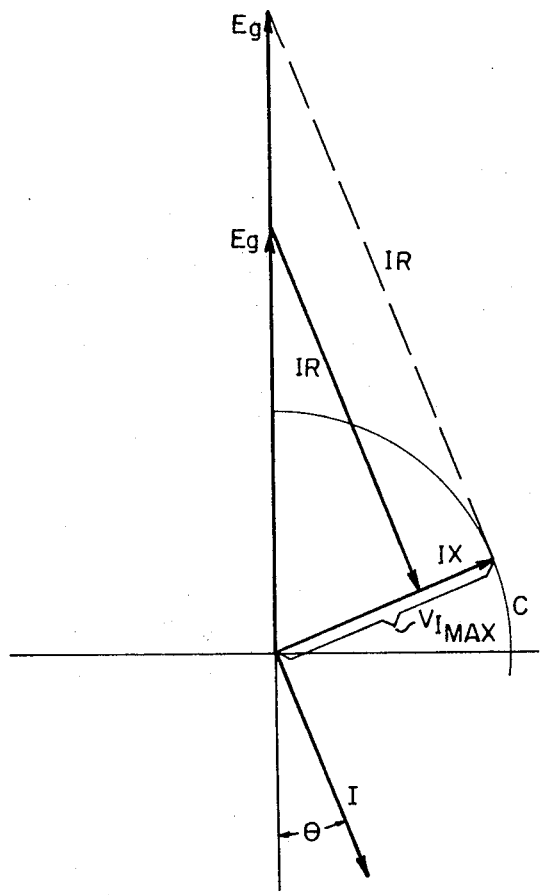
FIG. 3 is a vector diagram representing operation of the induction motor braking circuit of FIG. 2 at the limiting maximum frequency at which full air gap voltage and braking torque can be obtained for a given applied inverter voltage by inserting an impedance in series with the motor windings.

The vector diagram of FIG. 3 illustrates the voltage and current relationships of a single phase of the braking circuit of FIG. 2 at the limiting maximum frequency at which full air gap voltage and braking torque can be obtained with a rated inverter voltage of $V_{I\,max}$ by inserting an impedance in series with the motor windings by making the thyristors 23 through 28 non-conductive during the braking operation of the induction machine. The normal braking current representing full rated torque is represented by the vector I, the air gap voltage of the induction machine, which is proportional to machine speed, is represented by the vector $E_g$ and the rated voltage which the inverter can produce is represented by the vector $V_{I\,max}$ whose magnitude is equal to the radius of the circle C. The resistance voltage drop in resistors 14 through 19 is represented by the vector IR and the reactance voltage drop due to the effective inductance of resistors 14 through 19 and the current phase lag caused by the controlled conduction of the braking thyristors 23 through 28 are represented by the vector IX. The current I lags the voltage $E_g$ by an angle of $(180°-\theta)$ where $\theta$ depends on the internal inductance of the induction machine. The voltage drops IR and IX add vectorially and combine with the applied voltage $V_I$ to give the resultant machine air gap voltage $E_g$. It will be seen that the air gap voltage $E_g$ is substantially greater than the inverter voltage $V_I$ in order to maintain full braking torque without requiring the voltage supplied by the inverter to be increased above that needed for motor operation.

FIG. 3 illustrates that the equivalent inductance limits the performance of the dynamic braking circuit of FIG. 2. If nominal braking current I representing full rated torque is maintained, a decrease in induction machine operating frequency would result in a reduction of the air gap voltage $E_g$, but the current phase lag caused by the controlled conduction of the braking thyristor 25 though 28 may cause the IX vector to extend outside the circle "C" so that the voltage required from the inverter would exceed the rated voltage represented by $V_{I\,max}$. If nominal braking current I is maintained, an increase in induction machine operating frequency would result in an increase of the air gap voltage $E_g$, but the effective inductance of the resistors 14 through 19 and the current phase lag caused by the controlled conduction of the braking thyristors 23 through 28 would cause the IX vector to extend outside the circle C so that the voltage required from the inverter would exceed the rated voltage represented by $V_{I\,max}$. If the equivalent inductive impedance of the braking circuit is compensated for, then full torque operation is possible up to the maximum top speed indicated by the dashed line of FIG. 3. Moreover, if compensation for the motor inductance is also provided, the angle $\theta$ can be decreased and full torque operation can be realized at even higher operating speeds.

FIG. 2 uses a resistor-capacitor network to compensate for the effective inductance of the braking resistors 14 through 19, the current phase lag caused by the controlled conduction of the braking thyristors, and the inductance of the motor windings. The resistances of resistors 15, 17 and 19 are approximately 10% of the resistances of resistors 14, 16 and 18. Capacitors 20, 21 and 22 are connected as shown in FIG. 2. Resistors 15, 17 and 19 are primarily used for limiting the discharge rate of capacitors 20, 21 and 22 when the thyristors 23 through 28 are turned on. The capacitive compensation for the motor inductance of the braking circuit causes the current vector I in FIG. 3 to rotate in a clockwise direction to decrease the angle $\theta$ and thereby allow a higher value of air gap voltage $E_g$ which would permit a higher maximum operating speed at full braking torque. The capacitive compensation for the effective inductance of the resistors 14 through 19, and the current phase lag caused by the controlled conduction of the braking thyristors decreases the magnitude of the IX vector thereby also allowing a greater value of $E_g$ and permitting a higher maximum operating speed at full braking torque. While the circuit thus far described would have performance characteristics adequate for some applications, improved performance characteristics could be obtained through the following, disclosed improvement.

Figure 4:
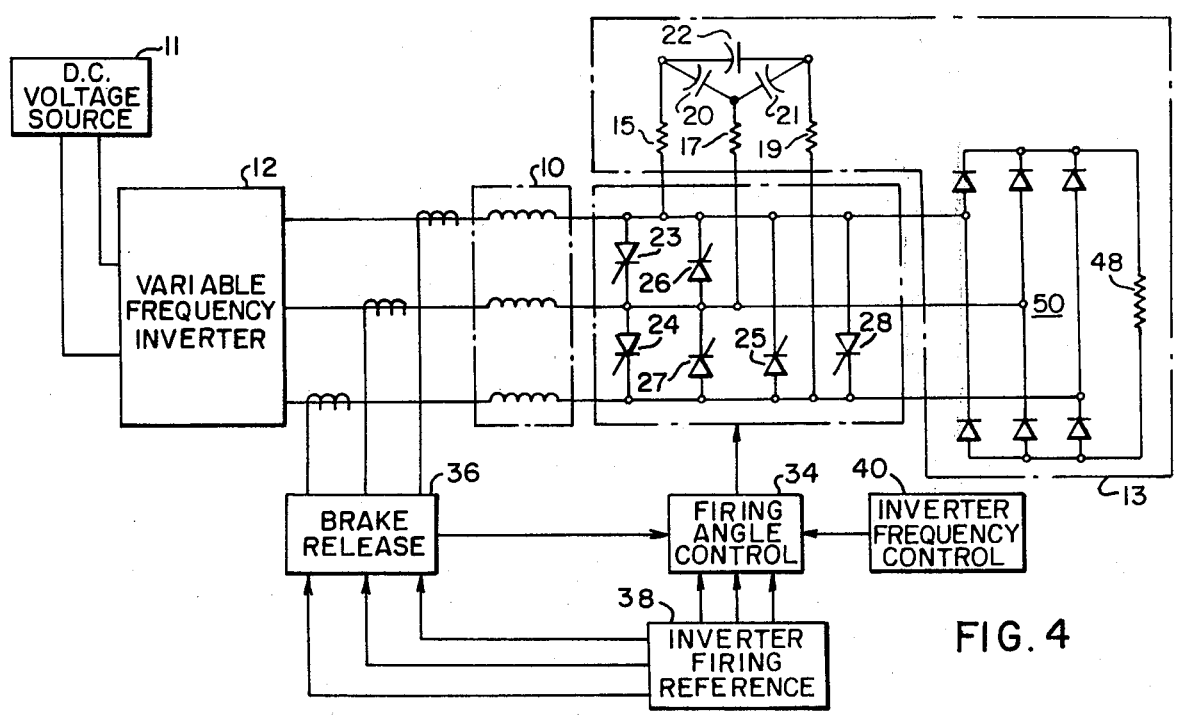
FIG. 4 represents the preferred embodiment of the disclosed braking circuit which provides a unidirectional current to a common braking resistor through a rectifier bridge.

The presently disclosed method and apparatus for improved dynamic braking of induction motors, as shown in FIG. 4, substantially reduces the effective inductance of the dynamic braking impedance 13 by causing the braking current flowing through the braking resistor 48 to be unidirectional. The motor windings 10 are supplied by a variable frequency inverter 12 which operates with a constant potential voltage source 11. Capacitor 20 is connected between resistors 15 and 17, capacitor 21 is connected between resistors 17 and 19, and capacitor 22 is connected between resistors 15 and 19 primarily to compensate for the braking circuit inductance due to the current phase lag caused by the controlled conduction of the braking thyristors 23 through 28, and the inductance of the motor windings 10. Capacitors 20, 21 and 22 also compensate for the braking circuit inductance due to the comparatively small effective inductance of resistors 15, 17, 19 and 48. As in the prior art circuit of FIG. 2, resistors 15 and 17 and 19 are used to limit the initial discharge rate of the capacitors 20, 21 and 22 when braking thyristors 23 through 28 are fired. Firing angle control 34 receives signals from brake release circuit 36 inverter firing reference 38, and an inverter frequency control 40 to provide the gate signals for appropriately firing thyristors 23 through 28. The unidirectional current is supplied to braking resistor 48 from a rectifier bridge 50 to substantially decrease the effective inductance of the braking impedance 13. It has been experimentally determined that, due to the unidirectional current in braking resistor 48, the capacitance required to compensate for the braking circuit inductance of the circuit illustrated in FIG. 4 is about ⅓ the capacitance necessary to compensate for the braking circuit inductance of the circuit illustrated in FIG. 2. Additionally, since all the machine currents in the FIG. 4 arrangement flow through a common resistor 48, the line-to-line voltages for the circuit of FIG. 4 are inherently balanced, making the meticulous balancing of individual resistors 14 through 19 as shown in FIG. 2 unnecessary.

Figure 5:
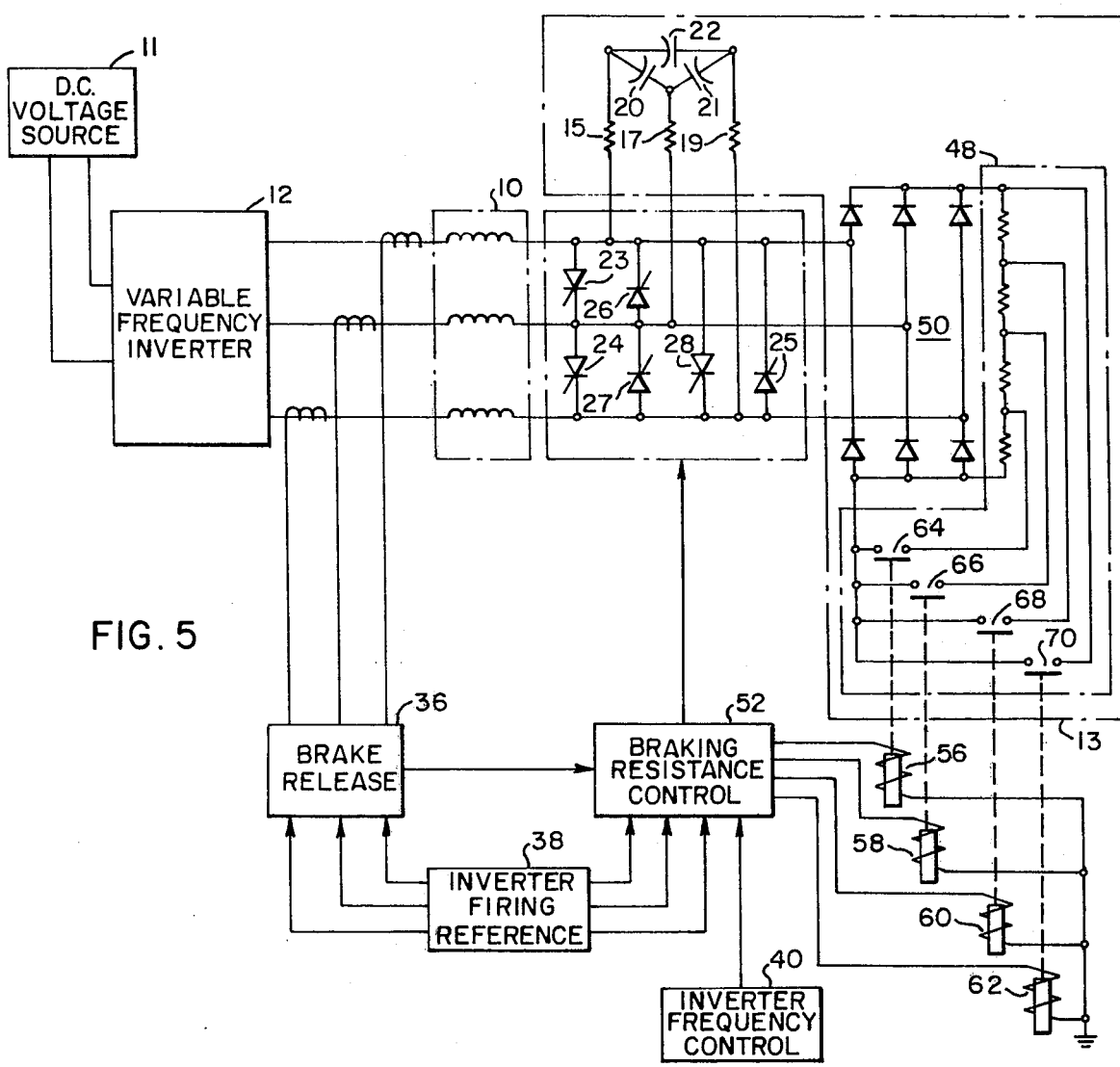
FIG. 5 represents a modification of the preferred embodiment of the disclosed induction motor dynamic braking circuit which makes the common dissipative resistor variable in a step-wise fashion.
Figure 6:
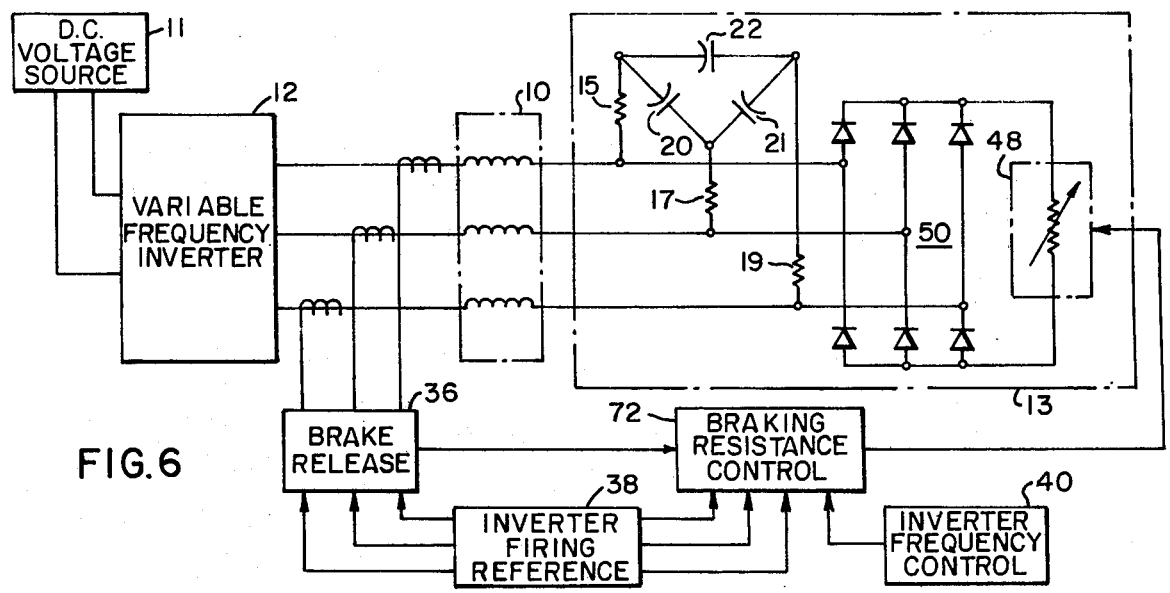
FIG. 6 represents a second modification of the disclosed induction motor dynamic braking circuit which elinimates the dynamic braking impedance switching means and makes the common dissapative resistors variable in either a continuous or step wise-fashion.

FIGS. 5 and 6 show modifications of the method and apparatus shown in FIG. 4 in which the effective inductance of the circuit may be further reduced by controlling the magnitude of braking resistor 48. In the circuit arrangement of FIG. 5, a suitable braking resistance control 52 controls the effective braking impedance by controlling in a well known manner, the firing angle of thyristors 23 through 28 and by controlling the resistance of braking resistor 48 in a well known, step-wise manner through contactor coils 56, 58, 60 and 62 which control contacts 64, 66, 68 and 70 respectively. In the circuit arrangements of FIGS. 4 and 5, the rectifier bridge 50 and the braking resistor 48 need carry braking current only when high torque dynamic braking is desired. When the braking resistance control 52 of FIG. 5 controls the braking resistor 48 in a step-wise fashion, it has been experimentally determined that there is an additional reduction in the capacitance necessary to compensate for the effective impedance of the braking circuit below the substantial reduction provided by the circuits of FIG. 4.

In FIG. 6 the effective resistance of braking resistor 48 is controlled in a continuously variable fashion by a suitable braking resistance control 72 which, for example, could be comprised of a remotely-controlled rheostat as is well known in the art, and the dynamic braking resistance control provided by thyristors 23 through 28 of FIG. 4 has been eliminated. Alternatively, when the braking circuit permits less complexity and lower performance, the braking resistance control 72 may provide step-wise control of the braking resistor 48 while eliminating the braking impedance control provided by thyristors 23 through 28 of FIG. 4. Since the braking circuit of FIG. 6 eliminates braking thryistors 23 through 28, capacitors 20, 21, and 22 in FIG. 6 do not compensate for the substantial current lag caused by thyristors 23 through 28. Therefore, the capacitance required to compensate for the effective inductance of the braking circuit of FIG. 6 is less than the compensative capacitance required by the circuits of FIGS. 4 and 5.

We claim:

1. A method for obtaining nominal braking torque from an induction machine over a predetermined range of induction machine operating speeds, said method including the steps of:
   providing an alternating voltage of a predetermined maximum magnitude to said induction machine;
   establishing an impedance voltage having an effective reactive component and an effective resistive component which are additive to said alternating voltage;
   providing a unidirectional current to reduce the magnitude of said effective reactive component; and
   controlling said established impedance voltage in relation to said provided alternating voltage to provide said nominal braking torque over said predetermined range of operating speeds.

2. The method of claim 1 with said established impedance voltage being controlled in a continuously variable manner.

3. The method of claim 1 with said established impedance voltage being controlled in a step-wise variable manner.

4. The method of claim 1, including the step of compensating for said reduced effective reactive component of said established impedance voltage.

5. The method of claim 1, with said unidirectional current being provided through the operation of a diode bridge rectifier.

6. The method of claim 4, with said reduced effective reactive component of said established impedance voltage being compensated through the operation of a circuit including at least one resistor and at least one capacitor.

7. The method of claim 1, with said step of providing a unidirectional current providing balanced line-to-line voltages in said induction machine.

8. In apparatus for obtaining nominal braking torque from an induction machine over a predetermined range of induction machine operating speeds, the combination of:
   means for providing an alternative voltage of a predetermined maximum magnitude to said induction machine;
   means for establishing an impedance voltage having an effective reactive component and an effective resistive component which are additive to said alternating voltage;
   means for providing a unidirectional current for reducing said effective reactive component; and
   means for controlling said established impedance voltage in relation to said provided alternating voltage to provide said nominal braking torque over said predetermined range of operating speeds.

9. The apparatus of claim 8 in which said controlling means varies said established impedance voltage in a continuous manner.

10. The apparatus of claim 8 in which said controlling means varies said established impedance voltage in a step-wise manner.

11. The apparatus of claim 8, including means for compensating for said reduced effective reactive component through the operation of a circuit having at least one resistor and at least one capacitor.

12. The apparatus of claim 8 in which said means for providing said unidirectional current includes a diode bridge rectifier.

* * * * *